United States Patent
Liu et al.

(10) Patent No.: US 10,404,844 B1
(45) Date of Patent: *Sep. 3, 2019

(54) MOBILE TERMINAL UNLOCK METHOD FOR SECURITY PROTECTION OF MOBILE PHONE

(71) Applicants: Xiaojun Liu, Shenzhen (CN); Minsheng Wang, Shenzhen (CN)

(72) Inventors: Xiaojun Liu, Shenzhen (CN); Minsheng Wang, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/280,088

(22) Filed: Feb. 20, 2019

Related U.S. Application Data

(63) Continuation of application No. 16/133,772, filed on Sep. 18, 2018, now Pat. No. 10,218,832, which is a continuation of application No. 15/990,922, filed on May 29, 2018, now Pat. No. 10,142,452.

(30) Foreign Application Priority Data

Apr. 28, 2018 (CN) .......................... 2018 1 0402847

(51) Int. Cl.
| | |
|---|---|
| *G06F 21/31* | (2013.01) |
| *G06F 21/34* | (2013.01) |
| *H04M 1/725* | (2006.01) |
| *H04M 1/673* | (2006.01) |

(52) U.S. Cl.
CPC ............ *H04M 1/673* (2013.01); *G06F 21/31* (2013.01); *G06F 21/34* (2013.01); *H04M 1/72572* (2013.01)

(58) Field of Classification Search
USPC .......................................................... 455/411
See application file for complete search history.

(56) References Cited

U.S. PATENT DOCUMENTS

| | | | |
|---|---|---|---|
| 8,286,103 B2 | 10/2012 | Chaudhri et al. | |
| 9,442,624 B2 | 9/2016 | Yang et al. | |
| 2013/0189952 A1* | 7/2013 | Kim | H04W 12/00 455/411 |
| 2015/0199016 A1* | 7/2015 | Suzuki | G06F 21/31 345/173 |
| 2017/0329953 A1* | 11/2017 | Defazio | G06F 3/016 |

* cited by examiner

*Primary Examiner* — Charles N Appiah
*Assistant Examiner* — Frank E Donado
(74) *Attorney, Agent, or Firm* — IPro, PLLC; Na Xu

(57) ABSTRACT

A mobile terminal unlock method for security protection of mobile phone is provided. The method includes: obtaining a trigger signal for unlock, and generating a first password according to the trigger signal; generating a corresponding unlock signal according to a preset correspondence between the unlock signal and the first password and with reference to the first password, and sending the corresponding unlock signal; obtaining an unlock password that is obtained by means of parsing by a user according to the unlock signal; matching the unlock password with the first password; determining whether the unlock password is consistent with the first password; and if a determining result is yes, unlocking a password lock; or if a determining result is no, obtaining a trigger signal for unlock again.

4 Claims, 4 Drawing Sheets

MOBILE TERMINAL UNLOCK METHOD FOR SECURITY PROTECTION OF MOBILE PHONE

CROSS REFERENCE TO RELATED APPLICATION

This application is a continuation of U.S. patent application Ser. No. 16/133,772, filed on Sep. 18, 2018, which is a continuation of U.S. patent application Ser. No. 15/990,922, filed on May 29, 2018, which claims priority to Chinese Patent Application No. 201810402847.0, filed on Apr. 28, 2018, all of which are hereby incorporated by reference in their entireties.

FIELD OF THE INVENTION

The present invention relates to the field of security technologies, and in particular, to a mobile terminal unlock method for security protection.

BACKGROUND OF THE INVENTION

A mobile phone unlock function is a basic function of prior-art mobile phone applications. The mobile phone unlock function includes multiple forms of unlock modes, which not only provide diversified experience effects for users, but also protect privacy of mobile phone users and mobile phone security effectively.

In the prior art, modes of locking a mobile phone screen are mainly lockout modes such as pattern lockout (a nine palace map in an Android mobile phone), PIN lockout, character password lockout, fingerprint recognition, and face recognition. Unlock methods used in the prior art are mainly: 1. Drawing an unlock pattern according to a pattern of a mobile phone screen. 2. Directly entering a PIN or a character password. 3. Using unlock methods such as a fingerprint recognition or face recognition mode. In the prior art, for pattern unlock, PIN unlock, and character password unlock, a password plaintext entered by a user is prone to be seen by others, and then the password set by the user are remembered and cracked by others, or the password set by the user is easily cracked by acquaintances or people who are proficient in psychology according to user's psychological habits.

For a mobile phone unlock method in the prior art, unlock is performed only by directly entering a password that is set by a user. In this case, only a relatively single unlock mode is available, and a password is easily cracked. Consequently, user privacy security and mobile phone security cannot be better ensured.

SUMMARY OF THE INVENTION

An embodiment of the present invention provides a mobile terminal unlock method, and the method includes:

obtaining a trigger signal for unlock, and generating a first password according to the trigger signal;

generating a corresponding unlock signal according to a preset correspondence between the unlock signal and the first password and with reference to the first password, and sending the corresponding unlock signal;

obtaining an unlock password that is obtained by means of parsing by a user according to the unlock signal; matching the unlock password with the first password; determining whether the unlock password is consistent with the first password; and if a determining result is yes, unlocking a password lock; or if a determining result is no, obtaining a trigger signal for unlock again.

In the mobile terminal unlock method described in this embodiment of the present invention, a first password may be generated according to a trigger signal for unlock, an unlock signal is generated according to the first password, an unlock password that is obtained by means of parsing by a user according to the unlock signal is obtained, match is performed to verify whether the unlock password is correct, and if the unlock password is correct, a password lock is unlocked, or if the unlock password is incorrect, unlock is performed again. The mobile terminal unlock method described in this embodiment improves mobile terminal user experience effect and mobile terminal security, and better protects privacy security of a mobile terminal user.

DETAILED DESCRIPTION OF THE EMBODIMENTS

Figure 1:
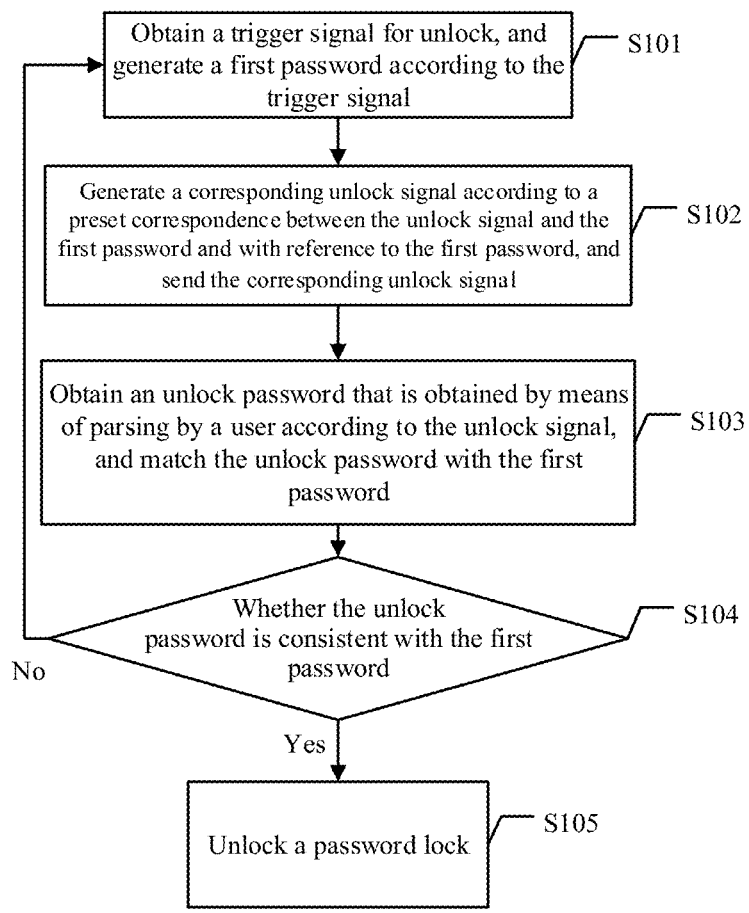
FIG. 1 is a schematic flowchart of Embodiment 1 of a mobile terminal unlock method according to an embodiment of the present invention.

Mobile terminal types provided in embodiments of the present invention include mobile terminals with unlock functions, such as a mobile phone, a walkman, a tablet computer, a notebook computer, and a PDA. An unlock signal described in the embodiments of the present invention includes a human body sensing signal such as vibration, sounds, pictures, and screen luminance. The described unlock signal may be an unlock signal in a single form of a sensing signal, or may be an unlock signal in multiple combination forms of multiple types of sensing signals. The following describes, with reference to the accompany drawings, the embodiments of the present invention by using an example in which a mobile terminal is a mobile phone, and an unlock signal is a vibration sensing signal. Referring to FIG. 1, FIG. 1 is a schematic flowchart of Embodiment 1 of a mobile terminal unlock method according to an embodiment of the present invention. The mobile terminal unlock method in this embodiment includes the following steps:

S101: Obtain a trigger signal for unlock, and generate a first password according to the trigger signal.

In specific implementation, the unlock method described in this embodiment not only can be applied to unlock of a mobile phone screen, and but also can be applied to unlock functions of mobile phone applications, such as unlock of an encrypted file in a mobile phone. The following details the unlock method described in this embodiment by using an example of unlocking a mobile phone screen. The trigger signal for unlock in this embodiment may be a trigger signal that is sent by touching a mobile phone screen by a mobile phone user when the mobile phone screen of a touchscreen mobile phone is in a lockout state, may be a trigger signal that is sent by pressing an unlock button of a mobile phone by a mobile phone user when a mobile phone screen of the non-touchscreen mobile phone is in a lockout state, or may be a trigger signal sent in another form for triggering unlock of a mobile phone screen. The foregoing trigger signal sending manners are merely examples rather than exhaustive descriptions, and this embodiment includes but is not limited to the foregoing trigger signal sending manners. After obtaining a trigger signal for unlock, a mobile phone randomly generates a password. A first password is generated after the mobile phone obtains a trigger signal, and the generated first password is an instant unlock password of the mobile phone. A password lock can be unlocked only when an unlock password entered by a user is consistent with the first password. A different first password may be generated each time after a mobile phone obtains a trigger signal, that is, an unlock password of the mobile phone is generated randomly and changes constantly. In this unlock method, a first password serves as an unlock password of a mobile phone, and a mobile phone password can be effectively protected from being identified and cracked, so that privacy security of a mobile phone user is better protected. For example, when a screen of a touchscreen mobile phone of a mobile phone user is in a lockout state, if the user wants to make a phone call, the user needs to unlock a password lock of the mobile phone screen, and enter a mobile phone screen to make a phone call. In this case, if the mobile phone user touches the mobile phone screen, the mobile phone obtains a trigger signal for unlock. After obtaining the trigger signal for unlock, the mobile phone generates a first password, for example, "210". The first password "210" is an unlock password of the mobile phone at this time. If the user wants to unlock the password lock of the mobile phone screen, "210" needs to be entered for unlock. If the mobile phone user does not want to make a phone call at the moment and does not enter a password to unlock the mobile phone screen, the user needs to touch the mobile phone screen again if the user wants to unlock the mobile phone screen next time. After obtaining a trigger signal, the mobile phone generates a new first password, for example, "220". "220" is an unlock password of the mobile phone at this time. A password lock of the mobile phone screen can be unlocked only after the mobile phone user enters "220".

S102: Generate a corresponding unlock signal according to a preset correspondence between the unlock signal and the first password and with reference to the first password, and send the corresponding unlock signal.

In specific implementation, the mobile phone user may preset a one-to-one correspondence between the unlock signal and the first password according to user preference, and store the correspondence to the mobile phone. After generating the first password, the mobile phone responds according to the correspondence, preset by the user, between the unlock signal and the first password, and sends the corresponding unlock signal. In specific implementation, the first password may contain a character such as a digit, a letter, or a symbol. The first password may be in multiple combination forms, for example, may be one or more digits, one or more letters, or may be a combination of a digit and a letter, a combination of a digit and a symbol, or a combination of a letter and a symbol. The mobile phone user may preset a vibration mode corresponding to the digit, letter or symbol, including a vibration mode such as a vibration frequency, a vibration intensity, vibration duration, or a vibration combination form. The first password that contains these characters corresponds to a corresponding vibration mode. If the mobile phone obtains the first password, the mobile phone may generate a corresponding vibration signal according to the correspondence, preset by the mobile phone user, between the first password and a mobile phone vibration mode. The mobile phone user may determine and parse out a corresponding password according to the vibration signal of the mobile phone to obtain the unlock password of the mobile phone at this time. For example, the following Table 1 lists correspondences that can be preset by the mobile phone user and that are between a composition character of a first password of the mobile phone and a mobile phone vibration mode:

TABLE 1

| Character | Vibration mode |
| --- | --- |
| 0 | Weak vibration for 200 ms |
| 1 | Weak vibration for 100 ms and strong vibration for 100 ms |
| 2 | Strong vibration for 200 ms and weak vibration for 100 ms |
| ... | ... |

The correspondences, listed in Table 1, between a composition character of a first password of the mobile phone and a mobile phone vibration mode are merely some examples rather than exhaustive descriptions, and this embodiment includes but is not limited to the correspondences, listed in the foregoing table, between a composition character of a first password of the mobile phone and a mobile phone vibration mode. The mobile phone user may set different correspondences according to user preference.

Correspondences between a first password for unlocking the mobile phone and a mobile phone vibration mode can be obtained according to Table 1, as listed below in Table 2:

TABLE 2

| First password | Vibration mode |
| --- | --- |
| 01 | Weak vibration for 200ms, and weak vibration for 100 ms and strong vibration for 100 ms |
| 212 | Strong vibration for 200 ms and weak vibration for 100 ms, weak vibration for 100 ms and strong vibration for 100 ms, and strong vibration for 200 ms and weak vibration for 100 ms |
| 220 | Strong vibration for 200 ms and weak vibration for 100 ms, strong vibration for 200 ms and weak vibration for 100 ms, and weak vibration for 200 ms |
| ... | ... |

The correspondences, listed in Table 2, between a first password for unlocking the mobile phone and a mobile phone vibration mode are merely some examples rather than exhaustive descriptions, and this embodiment includes but is not limited to the correspondences, listed in the foregoing table, between a first password for unlocking the mobile phone and a mobile phone vibration mode. It may be learnt from Table 2 that, when a first password generated by the mobile phone is "220", the mobile phone may send a corresponding vibration signal "strong vibration for 200 ms and weak vibration for 100 ms, strong vibration for 200 ms and weak vibration for 100 ms, and weak vibration for 200 ms" according to the correspondences listed in Table 2. According to the mobile phone vibration signal felt by a hand of the user, the user may determine the first password of the mobile phone, that is, the unlock password of the mobile phone at this time. Alternatively, the user may set a time interval for mobile phone vibration according to user preference or recognition habits, so as to better determine and parse out the unlock password of the mobile phone. For example, the user may set a vibration time interval corresponding to characters that form the first password to 50 ms for a mobile phone vibration mode; when the first password generated by the mobile phone is "220", the mobile phone sends a corresponding vibration signal according to the correspondences listed in Table 2. The mobile phone first sends a vibration signal "strong vibration for 200 ms and weak vibration for 100 ms"; after an interval of 50 ms, the mobile phone sends a vibration signal "strong vibration for 200 ms and weak vibration for 100 ms"; and after an interval of 50 ms, the mobile phone sends a vibration signal "weak vibration for 200 ms". That is, the mobile phone first vibrates strongly for 200 ms and weakly for 100 ms; after 50 ms, vibrates strongly for 200 ms and weakly for 100 ms again; and after 50 ms, vibrates weakly for 200 ms. The mobile phone user determines, according to the vibration signal felt by a hand, that the unlock password of the mobile phone at this time is "220".

S103: Obtain an unlock password that is obtained by means of parsing by a user according to the unlock signal, and match the unlock password with the first password.

S104: Determine whether the unlock password is consistent with the first password, and if a determining result is yes, execute step S105, or if a determining result is no, execute step S101.

S105: Unlock a password lock.

In step S103, the mobile phone user may determine and parse out the unlock password of the mobile phone according to the mobile phone vibration mode. After parsing out the unlock password of the mobile phone, the mobile phone user may enter the unlock password that is obtained by means of parsing to the mobile phone for unlock. After obtaining the unlock password that is obtained by the mobile phone user by means of parsing according to the unlock signal, the mobile phone matches the obtained unlock password with the first password automatically generated by the mobile phone, and determines whether the unlock password entered by the mobile phone user is consistent with the first password automatically generated by the mobile phone. If the unlock password entered by the mobile phone user is consistent with the first password generated by the mobile phone, the password lock is unlocked. If the unlock password entered by the mobile phone user is inconsistent with the first password generated by the mobile phone, step S101 is returned to obtain a trigger signal for unlock again and generate a new first password, and a new round of unlock processing starts. The user may parse out a first password again, and enter an unlock password for unlock again. For example, the first password generated by the mobile phone for the first time is "220", and the mobile phone parses out and determines the password mistakenly and enters an unlock password "210". The password "210" obtained by the mobile phone is inconsistent with the first password "220" generated by the mobile phone, and the mobile phone sends an entry error signal. After learning a password entry error, the mobile phone user touches the mobile phone screen again. The mobile phone obtains a trigger signal for unlock again, generates a new first password "211", and sends a corresponding unlock signal. The mobile phone user obtains, again by means of parsing according to the unlock signal sent by the mobile phone, the unlock password "211", and enters the unlock password "211". After obtaining the unlock password "211", the mobile phone matches the unlock password with the first password. If the mobile phone determines that the unlock password is correct, the password lock of the screen is unlocked, and a standby screen of the mobile phone is displayed.

In the mobile terminal unlock method described in this embodiment of the present invention, a first password may be generated according to a trigger signal for unlock, an unlock signal is generated according to the first password, an unlock password that is obtained by means of parsing by a user according to the unlock signal is obtained, match is performed to verify whether the unlock password is correct, and if the unlock password is correct, a password lock is unlocked, or if the unlock password is incorrect, unlock is performed again. The mobile terminal unlock method described in this embodiment improves mobile terminal user experience and mobile terminal security, has a wide application, and better protects privacy security of a mobile terminal user.

Figure 2:
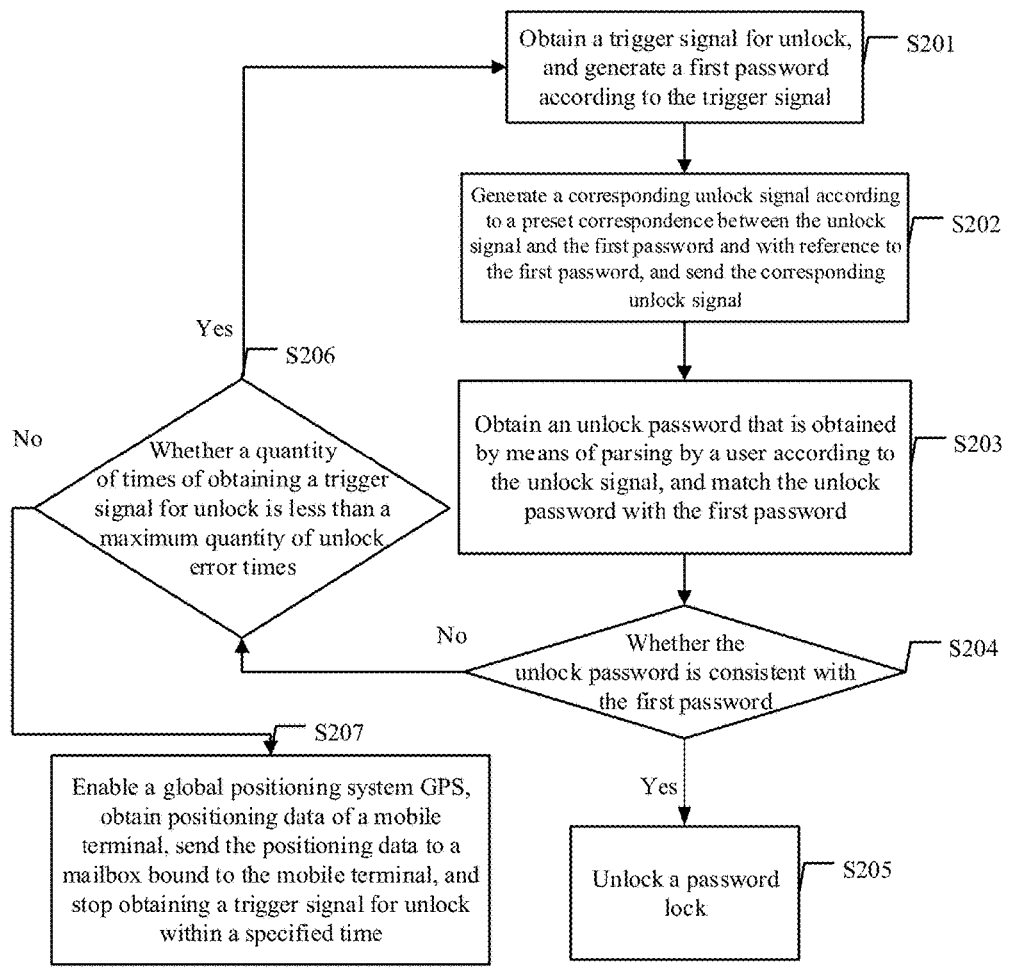
FIG. 2 is a schematic flowchart of Embodiment 2 of a mobile terminal unlock method according to an embodiment of the present invention.

Referring to FIG. 2, FIG. 2 is a schematic flowchart of Embodiment 2 of a mobile terminal unlock method according to an embodiment of the present invention. The mobile terminal unlock method in this embodiment includes the following steps:

S201: Obtain a trigger signal for unlock, and generate a first password according to the trigger signal.

In specific implementation, the unlock method described in this embodiment not only can be applied to unlock of a mobile phone screen, and but also can be applied to unlock functions of mobile phone applications, such as unlock of an encrypted file in a mobile phone. The following details the unlock method described in this embodiment by using an example of unlocking a mobile phone screen. The trigger signal for unlock in this embodiment may be a trigger signal that is sent by touching a mobile phone screen by a mobile phone user when the mobile phone screen of a touchscreen mobile phone is in a lockout state, may be a trigger signal that is sent by pressing an unlock button of a mobile phone by a mobile phone user when a mobile phone screen of the non-touchscreen mobile phone is in a lockout state, or may be a trigger signal sent in another form for triggering unlock of a mobile phone screen. The foregoing trigger signal sending manners are merely examples rather than exhaustive descriptions, and this embodiment includes but is not limited to the foregoing trigger signal sending manners. After obtaining a trigger signal for unlock, a mobile phone randomly generates a password. A first password is generated after the mobile phone obtains a trigger signal, and the generated first password is an instant unlock password of the mobile phone. A password lock can be unlocked only when an unlock password entered by a user is consistent with the first password. A different first password may be generated each time after a mobile phone obtains a trigger signal, that is, an unlock password of the mobile phone is generated randomly and changes constantly. In this unlock method, a first password serves as an unlock password of a mobile phone, and a mobile phone password can be effectively protected from being identified and cracked, so that privacy security of a mobile phone user is better protected. For example, when a screen of a touchscreen mobile phone of a mobile phone user is in a lockout state, if the user wants to make a phone call, the user needs to unlock a password lock of the mobile phone screen, and enter a mobile phone screen to make a phone call. In this case, if the mobile phone user touches the mobile phone screen, the mobile phone obtains a trigger signal for unlock. After obtaining the trigger signal for unlock, the mobile phone generates a first password, for example, "210". The first password "210" is an unlock password of the mobile phone at this time. If the user wants to unlock the password lock of the mobile phone screen, "210" needs to be entered for unlock. If the mobile phone user does not want to make a phone call at the moment and does not enter a password to unlock the mobile phone screen, the user needs to touch the mobile phone screen again if the user wants to unlock the mobile phone screen next time. After obtaining a trigger signal, the mobile phone generates a new first password, for example, "220". "220" is an unlock password of the mobile phone at this time. A password lock of the mobile phone screen can be unlocked only after the mobile phone user enters "220".

S202: Generate a corresponding unlock signal according to a preset correspondence between the unlock signal and the first password and with reference to the first password, and send the corresponding unlock signal.

In specific implementation, the mobile phone user may preset a one-to-one correspondence between the unlock signal and the first password according to user preference, and store the correspondence to the mobile phone. After generating the first password, the mobile phone responds according to the correspondence, preset by the user, between the unlock signal and the first password, and sends the corresponding unlock signal. In specific implementation, the first password may contain a character such as a digit, a letter, or a symbol. The first password may be in multiple combination forms, for example, may be one or more digits, one or more letters, or may be a combination of a digit and a letter, a combination of a digit and a symbol, or a combination of a letter and a symbol. The mobile phone user may preset a vibration mode corresponding to the digit, letter or symbol, including a vibration mode such as a vibration frequency, a vibration intensity, vibration duration, or a vibration combination form. The first password that contains these characters corresponds to a corresponding vibration mode. If the mobile phone obtains the first password, the mobile phone may generate a corresponding vibration signal according to the correspondence, preset by the mobile phone user, between the first password and a mobile phone vibration mode. The mobile phone user may determine and parse out a corresponding password according to the vibration signal of the mobile phone to obtain the unlock password of the mobile phone at this time. For example, the following Table 3 lists correspondences that can be preset by the mobile phone user and that are between a composition character of a first password of the mobile phone and a mobile phone vibration mode:

TABLE 3

| Character | Vibration mode |
| --- | --- |
| 0 | Weak vibration for 200 ms |
| 1 | Weak vibration for 100 ms and strong vibration for 100 ms |
| 2 | Strong vibration for 200 ms and weak vibration for 100 ms |
| ... | ... |

The correspondences, listed in Table 3, between a composition character of a first password of the mobile phone and a mobile phone vibration mode are merely some examples rather than exhaustive descriptions, and this embodiment includes but is not limited to the correspondences, listed in the foregoing table, between a composition character of a first password of the mobile phone and a mobile phone vibration mode. The mobile phone user may set different correspondences according to user preference.

Correspondences between a first password for unlocking the mobile phone and a mobile phone vibration mode can be obtained according to Table 3, as listed below in Table 4:

TABLE 4

| First password | Vibration mode |
| --- | --- |
| 01 | Weak vibration for 200 ms, and weak vibration for 100 ms and strong vibration for 100 ms |
| 212 | Strong vibration for 200 ms and weak vibration for 100 ms, weak vibration for 100 ms and strong vibration for 100 ms, and strong vibration for 200 ms and weak vibration for 100 ms |
| 220 | Strong vibration for 200 ms and weak vibration for 100 ms, strong vibration for 200 ms and weak vibration for 100 ms, and weak vibration for 200 ms |
| ... | ... |

The correspondences, listed in Table 4, between a first password for unlocking the mobile phone and a mobile phone vibration mode are merely some examples rather than exhaustive descriptions, and this embodiment includes but is not limited to the correspondences, listed in the foregoing table, between a first password for unlocking the mobile phone and a mobile phone vibration mode. It may be learnt from Table 4 that, when a first password generated by the mobile phone is "220", the mobile phone may send a corresponding vibration signal "strong vibration for 200 ms and weak vibration for 100 ms, strong vibration for 200 ms and weak vibration for 100 ms, and weak vibration for 200 ms" according to the correspondences listed in Table 4. According to the mobile phone vibration signal felt by a hand of the user, the user may determine the first password of the mobile phone, that is, the unlock password of the mobile phone at this time. Alternatively, the user may set a time interval for mobile phone vibration according to user preference or recognition habits, so as to better determine and parse out the unlock password of the mobile phone. For example, the user may set a vibration time interval corresponding to characters that form the first password to 50 ms for a mobile phone vibration mode; when the first password generated by the mobile phone is "220", the mobile phone sends a corresponding vibration signal according to the correspondences listed in Table 4. The mobile phone first sends a vibration signal "strong vibration for 200 ms and weak vibration for 100 ms"; after an interval of 50 ms, the mobile phone sends a vibration signal "strong vibration for 200 ms and weak vibration for 100 ms"; and after an interval of 50 ms, the mobile phone sends a vibration signal "weak vibration for 200 ms". That is, the mobile phone first vibrates strongly for 200 ms and weakly for 100 ms; after 50 ms, vibrates strongly for 200 ms and weakly for 100 ms again; and after 50 ms, vibrates weakly for 200 ms. The mobile phone user determines, according to the vibration signal felt by a hand, that the unlock password of the mobile phone at this time is "220".

S203: Obtain an unlock password that is obtained by means of parsing by a user according to the unlock signal, and match the unlock password with the first password.

S204: Determine whether the unlock password is consistent with the first password, and if a determining result is yes, execute step S205, or if a determining result is no, execute step S206.

S205: Unlock a password lock.

S206: Determine whether a quantity of times of obtaining a trigger signal for unlock is less than a maximum quantity of unlock error times, and if a determining result is yes, execute step S201, or if a determining result is no, execute step S207.

S207: Enable a global positioning system GPS, obtain positioning data of a mobile terminal, send the positioning data to a mailbox bound to the mobile terminal, and stop obtaining a trigger signal for unlock within a specified time.

In step S203, the mobile phone user may determine and parse out the unlock password of the mobile phone according to the mobile phone vibration mode. After parsing out the unlock password of the mobile phone, the mobile phone user may enter the unlock password that is obtained by means of parsing to the mobile phone for unlock. After obtaining the unlock password that is obtained by the mobile phone user by means of parsing according to the unlock signal, the mobile phone matches the obtained unlock password with the first password automatically generated by the mobile phone, and determines whether the unlock password entered by the mobile phone user is consistent with the first password automatically generated by the mobile phone. If the unlock password entered by the mobile phone user is consistent with the first password generated by the mobile phone, the password lock is unlocked. If the unlock password entered by the mobile phone user is inconsistent with the first password generated by the mobile phone, it is further determined whether the quantity of obtaining a trigger signal for unlock is less than the maximum quantity of unlock error times. If the quantity of obtaining a trigger signal for unlock is less than the maximum quantity of unlock error times, step S201 is returned to obtain a trigger signal for unlock again and generate a new first password, and a new round of unlock processing starts. The user may parse out a first password again, and enter an unlock password for unlock again. If the quantity of obtaining a trigger signal for unlock is equal to or exceeds the maximum quantity of unlock error times, that is, unlock performed by the mobile phone user fails, the global positioning system GPS is enabled, the positioning data of the mobile phone is obtained, the obtained positioning data of the mobile phone is sent to the mailbox bound to the mobile phone, and a trigger signal for unlock is no longer obtained within a specified time. The maximum quantity of unlock error times is a total quantity of times that the mobile phone user is allowed to enter an incorrect password and that is preset by the mobile phone user, that is, a total quantity of consecutive times that the mobile phone user is allowed to enter an incorrect password. The specified time mentioned in "a trigger signal for unlock is no longer obtained within a specified time" is a time for which the mobile terminal is automatically locked after an unlock failure and that is preset by a mobile phone user, that is, duration for which the mobile phone is automatically locked after the mobile phone user fails to perform unlock successfully for the preset maximum quantity of unlock error times. Within the lockout time, the mobile phone no longer allows an unlock attempt by the mobile phone user. Therefore, within the lockout time, the mobile phone user cannot unlock the screen to use the mobile phone. In specific implementation, the mobile phone user may preset a maximum quantity of unlock error times and a lockout time of the mobile phone according to user preference. The mobile phone user may further bind the mobile phone of the user to a mailbox of the user. If unlock performed by the mobile phone user fails, the mobile phone sends the positioning data of the mobile phone to the mailbox bound to the mobile phone. After obtaining information about the positioning data of the mobile phone from the mailbox of the mobile phone user, the mobile phone user may track a location of the mobile phone according to the information about the positioning data. If the mobile phone is lost or stolen, a location of the mobile phone can be tracked according to the information about the positioning data, to regain the lost mobile phone.

The following details a process of completing unlock of a mobile phone screen by using a simple example, where such unlock is completed by a mobile phone by matching an unlock password entered by a mobile phone user with a first password automatically generated by the mobile phone. For example, when a generated first password is "220" after a mobile phone obtains a trigger signal for unlock for the first time, a mobile phone user obtains an unlock password "220" by means of parsing according to an unlock signal sent by the mobile phone, and enter the unlock password "220" to the mobile phone for unlock. The mobile phone matches the unlock password entered by the mobile phone user with a first password automatically generated by the mobile phone. If the mobile phone determines that the unlock password is consistent with the first password, a password lock of a mobile phone screen is unlocked, and a standby screen of the mobile phone is displayed. If the mobile phone user parses out and determines the password mistakenly according to the unlock signal sent by the mobile phone and enters an unlock password "210", the password "210" obtained by the mobile phone is inconsistent with the first password "220" generated by the mobile phone, and an entry error signal is sent. After learning a password entry error, the mobile phone user may touch the mobile phone screen again. The mobile phone obtains a trigger signal for unlock again, generates a new first password "211", and sends a corresponding unlock signal. The mobile phone user obtains, again by means of parsing according to the unlock signal sent by the mobile phone, the unlock password "211", and enters the unlock password "211". After obtaining the unlock password "211", the mobile phone matches the unlock password with the first password. If the mobile phone determines that the unlock password is correct, the password lock of the screen is unlocked, and a standby screen of the mobile phone is displayed. If the mobile phone user parses out and determines the password mistakenly and enters an incorrect password, the mobile phone user may touch the mobile phone screen again, and perform unlock again. It is assumed that the maximum quantity of unlock error times preset by the mobile phone user is four, and the lockout time is one minute. If the mobile phone user mistakenly determines the password for four times and enters an incorrect password for four times, the mobile phone is automatically locked for one minute, and the mobile phone user can continue to attempt to perform unlock only after one minute.

In the mobile terminal unlock method described in this embodiment of the present invention, a first password may be generated according to a trigger signal for unlock, an unlock signal is generated according to the first password, an unlock password that is obtained by means of parsing by a user according to the unlock signal is obtained, match is performed to verify whether the unlock password is correct, and if the unlock password is correct, a password lock is unlocked, or if the unlock password is incorrect, unlock is performed again. In addition, according to the unlock method described in this embodiment of the present invention, a location of a mobile phone can be tracked according to obtained positioning data of the mobile phone. The mobile terminal unlock method described in this embodiment improves a mobile terminal user experience and mobile terminal security, has a wide application, and better protects privacy security of a mobile terminal user and mobile terminal security.

Figure 3:
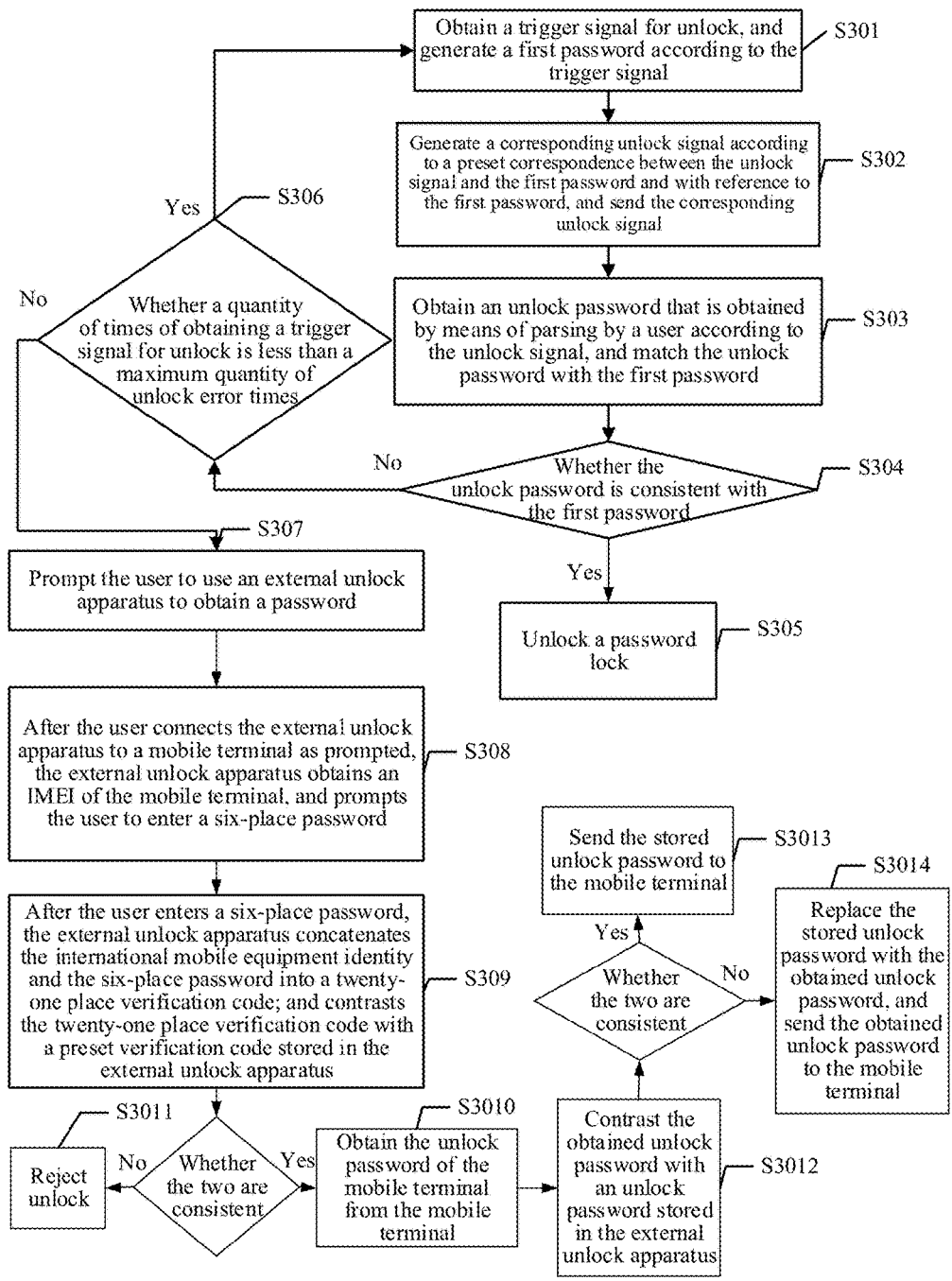
FIG. 3 is a schematic flowchart of Embodiment 3 of a mobile terminal unlock method according to an embodiment of the present invention.

Referring to FIG. 3, FIG. 3 is a schematic flowchart of Embodiment 3 of a mobile terminal unlock method according to an embodiment of the present invention. The mobile terminal unlock method in this embodiment includes the following steps:

S301: A mobile terminal obtains a trigger signal for unlock, and generates a first password according to the trigger signal.

S302: The mobile terminal generates a corresponding unlock signal according to a preset correspondence between the unlock signal and the first password and with reference to the first password, and sends the corresponding unlock signal.

S303: The mobile terminal obtains an unlock password that is obtained by means of parsing by a user according to the unlock signal, and matches the unlock password with the first password.

S304: The mobile terminal determines whether the unlock password is consistent with the first password, and if a determining result is yes, executes step S305, or if a determining result is no, executes step S306.

S305: The mobile terminal unlocks a password lock.

S306: The mobile terminal determines whether a quantity of times of obtaining a trigger signal for unlock is less than a maximum quantity of unlock error times, and if a determining result is yes, executes step S301, or if a determining result is no, executes step S307.

S307: The mobile terminal prompts the user to use an external unlock apparatus to obtain a password.

S308: After the user connects the external unlock apparatus to the mobile terminal as prompted, the external unlock apparatus obtains an international mobile equipment identity (IMEI) of the mobile terminal, and prompts the user to enter a six-place password.

S309: After the user enters a six-place password, the external unlock apparatus concatenates the international mobile equipment identity and the six-place password into a twenty-one place verification code; and contrasts the twenty-one place verification code with a preset verification code stored in the external unlock apparatus, and if the two are consistent, executes S3010, or if the two are inconsistent, executes S3011.

S3010: The external unlock apparatus obtains the unlock password of the mobile terminal from the mobile terminal, and then executes S3012

S3011: Reject unlock.

S3012: The external unlock apparatus contrasts the obtained unlock password with an unlock password stored in the external unlock apparatus, and if a contrast result is matched, executes S3013, or if a contrast result is unmatched, executes S3014.

S3013: The external unlock apparatus sends the stored unlock password to the mobile terminal, so that the mobile terminal performs unlock according to the unlock password sent by the external unlock apparatus.

S3014: The external unlock apparatus replaces the stored unlock password with the obtained unlock password, and sends the obtained unlock password to the mobile terminal, so that the mobile terminal performs unlock according to the unlock password sent by the external unlock apparatus.

Figure 4:
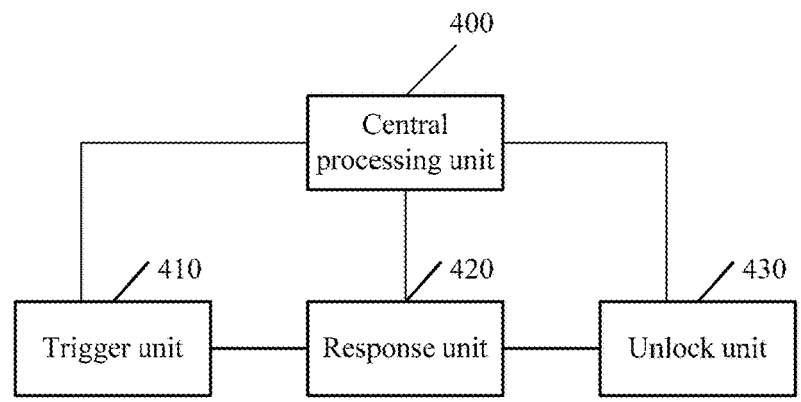
FIG. 4 is a schematic structural diagram of Embodiment 4 of a mobile terminal according to an embodiment of the present invention.

In the mobile terminal unlock method described in this embodiment of the present invention, a first password may be generated according to a trigger signal for unlock, an unlock signal is generated according to the first password, an unlock password that is obtained by means of parsing by a user according to the unlock signal is obtained, match is performed to verify whether the unlock password is correct, and if the unlock password is correct, a password lock is unlocked, or if the unlock password is incorrect, unlock is performed again. In addition, according to the unlock method described in this embodiment of the present invention, a location of a mobile phone can be tracked according to obtained positioning data of the mobile phone. The mobile terminal unlock method described in this embodiment improves a mobile terminal user experience and mobile terminal security, has a wide application, and better protects privacy security of a mobile terminal user and mobile terminal security. Referring to FIG. 4, FIG. 4 is a schematic structural diagram of Embodiment 4 of a mobile terminal according to an embodiment of the present invention. The mobile terminal in this embodiment includes a central processing unit 400, a trigger unit 410, a response unit 420, and an unlock unit 430.

The central processing unit 400 is configured to control the trigger unit 410, the response unit 420, and the unlock unit 430.

The trigger unit 410 is configured to: obtain a trigger signal for unlock, and generate a first password according to the trigger signal.

In specific implementation, the mobile terminal described in this embodiment may use the mobile terminal unlock method described in the foregoing embodiments. The mobile terminal unlock method described in the foregoing embodiments not only can be applied to mobile terminal screen unlock described in this embodiment, but also can be applied to an unlock function of a mobile terminal application described in this embodiment, such as unlock of an encrypted file in the mobile terminal described in this embodiment. The following details the mobile terminal in this embodiment by using an example in which screen unlock of a mobile phone is used as an application instance of the mobile terminal described in this embodiment. The trigger signal for unlock in this embodiment may be a trigger signal that is sent by touching a mobile phone screen by a mobile phone user when the mobile phone screen of a touchscreen mobile phone is in a lockout state, may be a trigger signal that is sent by pressing an unlock button of a mobile phone by a mobile phone user when a mobile phone screen of the non-touchscreen mobile phone is in a lockout state, or may be a trigger signal sent in another form for triggering unlock of a mobile phone screen. The foregoing trigger signal sending manners are merely examples rather than exhaustive descriptions, and this embodiment includes but is not limited to the foregoing trigger signal sending manners. After obtaining a trigger signal for unlock, the trigger unit 410 randomly generates a password. A first password is generated after the trigger unit 10 obtains a trigger signal, and the generated first password is an instant unlock password of a mobile phone. A password lock can be unlocked only when an unlock password entered by a user is consistent with the first password. A different first password may be generated each time after the trigger unit 410 obtains a trigger signal, that is, an unlock password of the mobile phone is generated randomly and changes constantly. In this unlock method, a first password serves as an unlock password of a mobile phone, and a mobile phone password can be effectively protected from being identified and cracked, so that privacy security of a mobile phone user is better protected. For example, when a screen of a touchscreen mobile phone of a mobile phone user is in a lockout state, if the user wants to make a phone call, the user needs to unlock a password lock of the mobile phone screen, and enter a standby screen of the mobile phone to make a phone call. In this case, if the mobile phone user touches the mobile phone screen, the trigger unit 410 obtains a trigger signal for unlock. After obtaining the trigger signal for unlock, the mobile phone generates a first password, for example, "210". The first password "210" is an unlock password of the mobile phone at this time. If the user wants to unlock the password lock of the mobile phone screen, "210" needs to be entered for unlock. If the mobile phone user does not want to make a phone call at the moment and does not enter a password to unlock the mobile phone screen, the user needs to touch the mobile phone screen again if the user wants to unlock the mobile phone screen next time. After obtaining a trigger signal, the mobile phone generates a new first password, for example, "220". "220" is an unlock password of the mobile phone at this time. A password lock of the mobile phone screen can be unlocked only after the mobile phone user enters "220".

The response unit 420 is configured to: generate a corresponding unlock signal according to a preset correspondence between the unlock signal and the first password and with reference to the first password, and send the corresponding unlock signal.

In specific implementation, the mobile phone user may preset a one-to-one correspondence between the unlock signal and the first password according to user preference, and store the correspondence to the mobile phone. After generating the first password by the trigger unit 410, the response unit 420 responds according to the correspondence, preset by the user, between the unlock signal and the first password, and sends the corresponding unlock signal. In specific implementation, the first password may contain a character such as a digit, a letter, or a symbol. The first password may be in multiple combination forms, for example, may be one or more digits, one or more letters, or may be a combination of a digit and a letter, a combination of a digit and a symbol, or a combination of a letter and a symbol. The mobile phone user may preset a vibration mode corresponding to the digit, letter or symbol, including a vibration mode such as a vibration frequency, a vibration intensity, vibration duration, or a vibration combination form. The first password that contains these characters corresponds to a corresponding vibration mode. If the response unit 420 obtains the first password sent by the trigger unit 410, the mobile phone may generate a corresponding vibration signal according to the correspondence, preset by the mobile phone user, between the first password and a mobile phone vibration mode. The mobile phone user may determine and parse out a corresponding password according to the vibration signal of the mobile phone to obtain the unlock password of the mobile phone at this time. For example, the following Table 5 lists correspondences that can be preset by the mobile phone user and that are between a composition character of a first password of the mobile phone and a mobile phone vibration mode:

TABLE 5

| Character | Vibration mode |
|---|---|
| 0 | Weak vibration for 200 ms |
| 1 | Weak vibration for 100 ms and strong vibration for 100 ms |
| 2 | Strong vibration for 200 ms and weak vibration for 100 ms |
| . . . | . . . |

The correspondences, listed in Table 5, between a composition character of a first password of the mobile phone and a mobile phone vibration mode are merely some examples rather than exhaustive descriptions, and this embodiment includes but is not limited to the correspondences, listed in the foregoing table, between a composition character of a first password of the mobile phone and a mobile phone vibration mode. The mobile phone user may set different correspondences according to user preference.

Correspondences between a first password for unlocking the mobile phone and a mobile phone vibration mode can be obtained according to Table 5, as listed below in Table 6:

TABLE 6

| First password | Vibration mode |
|---|---|
| 01 | Weak vibration for 200 ms, and weak vibration for 100 ms and strong vibration for 100 ms |
| 212 | Strong vibration for 200 ms and weak vibration for 100 ms, weak vibration for 100 ms and strong vibration for 100 ms, and strong vibration for 200 ms and weak vibration for 100 ms |
| 220 | Strong vibration for 200 ms and weak vibration for 100 ms, strong vibration for 200 ms and weak vibration for 100 ms, and weak vibration for 200 ms |
| . . . | . . . |

The correspondences, listed in Table 6, between a first password for unlocking the mobile phone and a mobile phone vibration mode are merely some examples rather than exhaustive descriptions, and this embodiment includes but is not limited to the correspondences, listed in the foregoing table, between a first password for unlocking the mobile phone and a mobile phone vibration mode. It may be learnt from Table 6 that, when a first password generated by the mobile phone is "220", the mobile phone may send a corresponding vibration signal "strong vibration for 200 ms and weak vibration for 100 ms, strong vibration for 200 ms and weak vibration for 100 ms, and weak vibration for 200 ms" according to the correspondences listed in Table 6. According to the mobile phone vibration signal felt by a hand of the user, the user may determine the first password of the mobile phone, that is, the unlock password of the mobile phone at this time. Alternatively, the user may set a time interval for mobile phone vibration according to user preference or recognition habits, so as to better determine and parse out the unlock password of the mobile phone. For example, the user may set a vibration time interval corresponding to characters that form the first password to 50 ms for a mobile phone vibration mode; when the first password generated by the mobile phone is "220", the mobile phone sends a corresponding vibration signal according to the correspondences listed in Table 6. The mobile phone first sends a vibration signal "strong vibration for 200 ms and weak vibration for 100 ms"; after an interval of 50 ms, the mobile phone sends a vibration signal "strong vibration for 200 ms and weak vibration for 100 ms"; and after an interval of 50 ms, the mobile phone sends a vibration signal "weak vibration for 200 ms". That is, the mobile phone first vibrates strongly for 200 ms and weakly for 100 ms; after 50 ms, vibrates strongly for 200 ms and weakly for 100 ms again; and after 50 ms, vibrates weakly for 200 ms. The mobile phone user determines, according to the vibration signal felt by a hand, that the unlock password of the mobile phone at this time is "220".

The unlock unit 430 is configured to: obtain an unlock password that is obtained by means of parsing by a user according to the unlock signal; match the unlock password with the first password; determine whether the unlock password is consistent with the first password; and if a determining result is yes, unlock a password lock; or if a determining result is no, instruct the trigger unit 410 to obtain a trigger signal for unlock again.

In specific implementation, the mobile phone user may determine and parse out the unlock password of the mobile phone according to the mobile phone vibration mode. After parsing out the unlock password of the mobile phone, the mobile phone user may enter the unlock password that is obtained by means of parsing to the mobile phone for unlock. After obtaining the unlock password that is obtained by the mobile phone user by means of parsing according to the unlock signal, the mobile phone matches the obtained unlock password with the first password automatically generated by the mobile phone, and determines whether the unlock password entered by the mobile phone user is consistent with the first password automatically generated by the mobile phone. If the unlock password entered by the mobile phone user is consistent with the first password generated by the mobile phone, the password lock is unlocked. If the unlock password entered by the mobile phone user is inconsistent with the first password generated by the mobile phone, a trigger signal for unlock is obtained again and a new first password is generated, and a new round of unlock processing starts. The user may parse out a first password again, and enter an unlock password for unlock again. For example, the first password generated by the mobile phone for the first time is "220", and the mobile phone parses out and determines the password mistakenly and enters an unlock password "210". The password "210" obtained by the mobile phone is inconsistent with the first password "220" generated by the mobile phone, and the mobile phone sends an entry error signal. After learning a password entry error, the mobile phone user touches the mobile phone screen again. The mobile phone obtains a trigger signal for unlock again, generates a new first password "211", and sends a corresponding unlock signal. The mobile phone user obtains, again by means of parsing according to the unlock signal sent by the mobile phone, the unlock password "211", and enters the unlock password "211". After obtaining the unlock password "211", the mobile phone matches the unlock password with the first password. If the mobile phone determines that the unlock password is correct, the password lock of the screen is unlocked, and a standby screen of the mobile phone is displayed.

In this embodiment of the present invention, a first password may be generated according to a trigger signal for unlock, an unlock signal is generated according to the first password, an unlock password that is obtained by means of parsing by a user according to the unlock signal is obtained, match is performed to verify whether the unlock password is correct, and if the unlock password is correct, a password lock is unlocked, or if the unlock password is incorrect, unlock is performed again. The mobile terminal described in this embodiment improves mobile terminal user experience and mobile terminal security, has a wide application, and better protects privacy security of a mobile terminal user.

Figure 5:
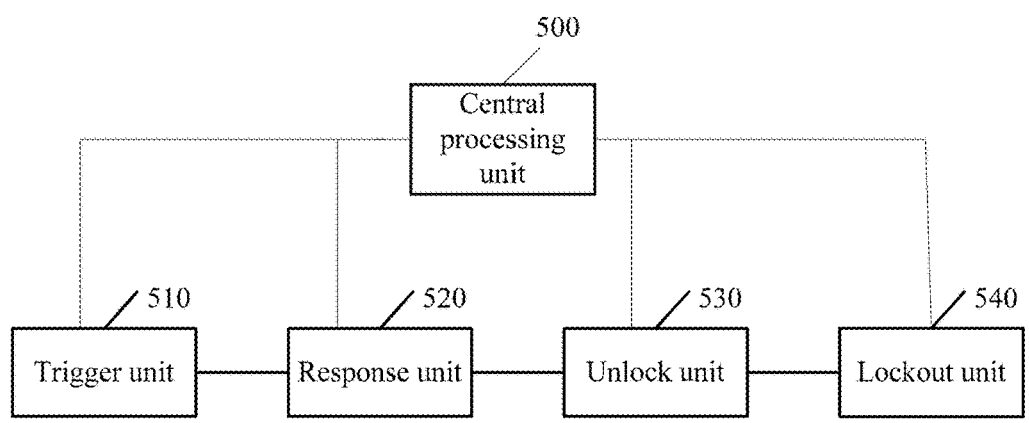
FIG. 5 is a schematic structural diagram of Embodiment 5 of a mobile terminal according to an embodiment of the present invention.

Referring to FIG. 5, FIG. 5 is a schematic structural diagram of Embodiment 5 of a mobile terminal according to an embodiment of the present invention. The mobile terminal in this embodiment includes a central processing unit 500, a trigger unit 510, a response unit 520, an unlock unit 530, and a lockout unit 540.

The central processing unit 500 is configured to control the trigger unit 510, the response unit 520, the unlock unit 530, and the lockout unit 540.

The trigger unit 510 is configured to: obtain a trigger signal for unlock, and generate a first password according to the trigger signal.

In specific implementation, the mobile terminal described in this embodiment may use the mobile terminal unlock method described in the foregoing embodiments. The mobile terminal unlock method described in the foregoing embodiments not only can be applied to mobile terminal screen unlock described in this embodiment, but also can be applied to an unlock function of a mobile terminal application described in this embodiment, such as unlock of an encrypted file in the mobile terminal described in this embodiment. The following details the mobile terminal in this embodiment by using an example in which screen unlock of a mobile phone is used as an application instance of the mobile terminal described in this embodiment. The trigger signal for unlock in this embodiment may be a trigger signal that is sent by touching a mobile phone screen by a mobile phone user when the mobile phone screen of a touchscreen mobile phone is in a lockout state, may be a trigger signal that is sent by pressing an unlock button of a mobile phone by a mobile phone user when a mobile phone screen of the non-touchscreen mobile phone is in a lockout state, or may be a trigger signal sent in another form for triggering unlock of a mobile phone screen. The foregoing trigger signal sending manners are merely examples rather than exhaustive descriptions, and this embodiment includes but is not limited to the foregoing trigger signal sending manners. After obtaining a trigger signal for unlock, the trigger unit 510 randomly generates a password. A first password is generated after the trigger unit 510 obtains a trigger signal, and the generated first password is an instant unlock password of a mobile phone. A password lock can be unlocked only when an unlock password entered by a user is consistent with the first password. A different first password may be generated each time after the trigger unit 510 obtains a trigger signal, that is, an unlock password of the mobile phone is generated randomly and changes constantly. In this unlock method, a first password serves as an unlock password of a mobile phone, and a mobile phone password can be effectively protected from being identified and cracked, so that privacy security of a mobile phone user is better protected. For example, when a screen of a touchscreen mobile phone of a mobile phone user is in a lockout state, if the user wants to make a phone call, the user needs to unlock a password lock of the mobile phone screen, and enter a standby screen of the mobile phone to make a phone call. In this case, if the mobile phone user touches the mobile phone screen, the trigger unit 510 obtains a trigger signal for unlock. After obtaining the trigger signal for unlock, the mobile phone generates a first password, for example, "210". The first password "210" is an unlock password of the mobile phone at this time. If the user wants to unlock the password lock of the mobile phone screen, "210" needs to be entered for unlock. If the mobile phone user does not want to make a phone call at the moment and does not enter a password to unlock the mobile phone screen, the user needs to touch the mobile phone screen again if the user wants to unlock the mobile phone screen next time. After obtaining a trigger signal, the mobile phone generates a new first password, for example, "220". "220" is an unlock password of the mobile phone at this time. A password lock of the mobile phone screen can be unlocked only after the mobile phone user enters "220".

The response unit 520 is configured to: generate a corresponding unlock signal according to a preset correspondence between the unlock signal and the first password and with reference to the first password, and send the corresponding unlock signal.

In specific implementation, the mobile phone user may preset a one-to-one correspondence between the unlock signal and the first password according to user preference, and store the correspondence to the mobile phone. After generating the first password by the trigger unit 510, the response unit 520 responds according to the correspondence, preset by the user, between the unlock signal and the first password, and sends the corresponding unlock signal. In specific implementation, the first password may contain a character such as a digit, a letter, or a symbol. The first password may be in multiple combination forms, for example, may be one or more digits, one or more letters, or may be a combination of a digit and a letter, a combination of a digit and a symbol, or a combination of a letter and a symbol. The mobile phone user may preset a vibration mode corresponding to the digit, letter or symbol, including a vibration mode such as a vibration frequency, a vibration intensity, vibration duration, or a vibration combination form. The first password that contains these characters corresponds to a corresponding vibration mode. If the response unit 520 obtains the first password sent by the trigger unit 510, the mobile phone may generate a corresponding vibration signal according to the correspondence, preset by the mobile phone user, between the first password and a mobile phone vibration mode. The mobile phone user may determine and parse out a corresponding password according to the vibration signal of the mobile phone to obtain the unlock password of the mobile phone at this time. For example, the following Table 7 lists correspondences that can be preset by the mobile phone user and that are between a composition character of a first password of the mobile phone and a mobile phone vibration mode:

TABLE 7

| Character | Vibration mode |
| --- | --- |
| 0 | Weak vibration for 200 ms |
| 1 | Weak vibration for 100 ms and strong vibration for 100 ms |
| 2 | Strong vibration for 200 ms and weak vibration for 100 ms |
| ... | ... |

The correspondences, listed in Table 7, between a composition character of a first password of the mobile phone and a mobile phone vibration mode are merely some examples rather than exhaustive descriptions, and this embodiment includes but is not limited to the correspondences, listed in the foregoing table, between a composition character of a first password of the mobile phone and a mobile phone vibration mode. The mobile phone user may set different correspondences according to user preference.

Correspondences between a first password for unlocking the mobile phone and a mobile phone vibration mode can be obtained according to Table 7, as listed below in Table 8:

TABLE 8

| First password | Vibration mode |
| --- | --- |
| 01 | Weak vibration for 200 ms, and weak vibration for 100 ms and strong vibration for 100 ms |
| 212 | Strong vibration for 200 ms and weak vibration for 100 ms, weak vibration for 100 ms and strong vibration for 100 ms, and strong vibration for 200 ms and weak vibration for 100 ms |

TABLE 8-continued

| First password | Vibration mode |
| --- | --- |
| 220 | Strong vibration for 200 ms and weak vibration for 100 ms, strong vibration for 200 ms and weak vibration for 100 ms, and weak vibration for 200 ms |
| ... | ... |

The correspondences, listed in Table 8, between a first password for unlocking the mobile phone and a mobile phone vibration mode are merely some examples rather than exhaustive descriptions, and this embodiment includes but is not limited to the correspondences, listed in the foregoing table, between a first password for unlocking the mobile phone and a mobile phone vibration mode. It may be learnt from Table 6 that, when a first password generated by the mobile phone is "220", the mobile phone may send a corresponding vibration signal "strong vibration for 200 ms and weak vibration for 100 ms, strong vibration for 200 ms and weak vibration for 100 ms, and weak vibration for 200 ms" according to the correspondences listed in Table 8. According to the mobile phone vibration signal felt by a hand of the user, the user may determine the first password of the mobile phone, that is, the unlock password of the mobile phone at this time. Alternatively, the user may set a time interval for mobile phone vibration according to user preference or recognition habits, so as to better determine and parse out the unlock password of the mobile phone. For example, the user may set a vibration time interval corresponding to characters that form the first password to 50 ms for a mobile phone vibration mode; when the first password generated by the mobile phone is "220", the mobile phone sends a corresponding vibration signal according to the correspondences listed in Table 8. The mobile phone first sends a vibration signal "strong vibration for 200 ms and weak vibration for 100 ms"; after an interval of 50 ms, the mobile phone sends a vibration signal "strong vibration for 200 ms and weak vibration for 100 ms"; and after an interval of 50 ms, the mobile phone sends a vibration signal "weak vibration for 200 ms". That is, the mobile phone first vibrates strongly for 200 ms and weakly for 100 ms; after 50 ms, vibrates strongly for 200 ms and weakly for 100 ms again; and after 50 ms, vibrates weakly for 200 ms. The mobile phone user determines, according to the vibration signal felt by a hand, that the unlock password of the mobile phone at this time is "220".

The unlock unit 530 is configured to: obtain an unlock password that is obtained by means of parsing by a user according to the unlock signal; match the unlock password with the first password; determine whether the unlock password is consistent with the first password; and if a determining result is yes, unlock a password lock; or if a determining result is no, instruct the trigger unit to obtain a trigger signal for unlock again.

The lockout unit 540 is configured to: if a quantity of times of obtaining a trigger signal for unlock exceeds a maximum quantity of unlock error times, enable a global positioning system GPS, obtain positioning data of the mobile terminal, send the positioning data to a mailbox bound to the mobile terminal, and stop obtaining a trigger signal within a specified time.

In specific implementation, the mobile phone user may determine and parse out the unlock password of the mobile phone according to the mobile phone vibration mode. After parsing out the unlock password of the mobile phone, the mobile phone user may enter the unlock password that is obtained by means of parsing to the mobile phone for unlock. After obtaining the unlock password that is obtained by the mobile phone user by means of parsing according to the unlock signal, the mobile phone matches the obtained unlock password with the first password automatically generated by the mobile phone, and determines whether the unlock password entered by the mobile phone user is consistent with the first password automatically generated by the mobile phone. If the unlock password entered by the mobile phone user is consistent with the first password generated by the mobile phone, the password lock is unlocked. If the unlock password entered by the mobile phone user is inconsistent with the first password generated by the mobile phone, it is further determined whether the quantity of obtaining a trigger signal for unlock is less than the maximum quantity of unlock error times. If the quantity of obtaining a trigger signal for unlock is less than the maximum quantity of unlock error times, a trigger signal for unlock is obtained again and a new first password is generated, and a new round of unlock processing starts. The user may parse out a first password again, and enter an unlock password for unlock again. If the quantity of obtaining a trigger signal for unlock is equal to or exceeds the maximum quantity of unlock error times, that is, unlock performed by the mobile phone user fails, the global positioning system GPS is enabled, the positioning data of the mobile phone is obtained, the obtained positioning data of the mobile phone is sent to the mailbox bound to the mobile phone, and a trigger signal for unlock is no longer obtained within a specified time. The maximum quantity of unlock error times is a total quantity of times that the mobile phone user is allowed to enter an incorrect password and that is preset by the mobile phone user, that is, a total quantity of consecutive times that the mobile phone user is allowed to enter an incorrect password. The specified time mentioned in "a trigger signal for unlock is no longer obtained within a specified time" is a time for which the mobile terminal is automatically locked after an unlock failure and that is preset by a mobile phone user, that is, duration for which the mobile phone is automatically locked after the mobile phone user fails to perform unlock successfully for the preset maximum quantity of unlock error times. Within the lockout time, the mobile phone no longer allows an unlock attempt by the mobile phone user. Therefore, within the lockout time, the mobile phone user cannot unlock the screen to use the mobile phone. In specific implementation, the mobile phone user may preset a maximum quantity of unlock error times and a lockout time of the mobile phone according to user preference. The mobile phone user may further bind the mobile phone of the user to a mailbox of the user. If unlock performed by the mobile phone user fails, the mobile phone sends the positioning data of the mobile phone to the mailbox bound to the mobile phone. After obtaining information about the positioning data of the mobile phone from the mailbox of the mobile phone user, the mobile phone user may track a location of the mobile phone according to the information about the positioning data. If the mobile phone is lost or stolen, a location of the mobile phone can be tracked according to the information about the positioning data, to regain the lost mobile phone.

The following details a process of completing unlock of a mobile phone screen by using a simple example, where such unlock is completed by a mobile phone by matching an unlock password entered by a mobile phone user with a first password automatically generated by the mobile phone. For example, when a generated first password is "220" after a mobile phone obtains a trigger signal for unlock for the first time, a mobile phone user obtains an unlock password "220" by means of parsing according to an unlock signal sent by the mobile phone, and enter the unlock password "220" to the mobile phone for unlock. The mobile phone matches the unlock password entered by the mobile phone user with a first password automatically generated by the mobile phone. If the mobile phone determines that the unlock password is consistent with the first password, a password lock of a mobile phone screen is unlocked, and a standby screen of the mobile phone is displayed. If the mobile phone user parses out and determines the password mistakenly according to the unlock signal sent by the mobile phone and enters an unlock password "210", the password "210" obtained by the mobile phone is inconsistent with the first password "220" generated by the mobile phone, and an entry error signal is sent. After learning a password entry error, the mobile phone user may touch the mobile phone screen again. The mobile phone obtains a trigger signal for unlock again, generates a new first password "211", and sends a corresponding unlock signal. The mobile phone user obtains, again by means of parsing according to the unlock signal sent by the mobile phone, the unlock password "211", and enters the unlock password "211". After obtaining the unlock password "211", the mobile phone matches the unlock password with the first password. If the mobile phone determines that the unlock password is correct, the password lock of the screen is unlocked, and a standby screen of the mobile phone is displayed. If the mobile phone user parses out and determines the password mistakenly and enters an incorrect password, the mobile phone user may touch the mobile phone screen again, and perform unlock again. It is assumed that the maximum quantity of unlock error times preset by the mobile phone user is four, and the lockout time is one minute. If the mobile phone user mistakenly determines the password for four times and enters an incorrect password for four times, the mobile phone is automatically locked for one minute, and the mobile phone user can continue to attempt to perform unlock only after one minute.

In this embodiment of the present invention, a first password may be generated according to a trigger signal for unlock, an unlock signal is generated according to the first password, an unlock password that is obtained by means of parsing by a user according to the unlock signal is obtained, match is performed to verify whether the unlock password is correct, and if the unlock password is correct, a password lock is unlocked, or if the unlock password is incorrect, unlock is performed again. In addition, according to the unlock method described in this embodiment of the present invention, a location of a mobile phone can be tracked according to obtained positioning data of the mobile phone. The mobile terminal unlock method described in this embodiment improves a mobile terminal user experience and mobile terminal security, has a wide application, and better protects privacy security of a mobile terminal user and mobile terminal security.

Figure 6:
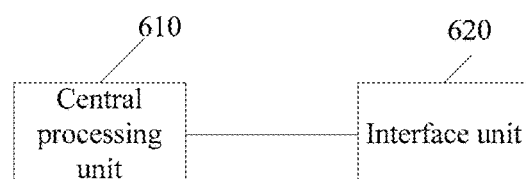
FIG. 6 is a schematic structural diagram of an embodiment of an external unlock apparatus according to an embodiment of the present invention.

Referring to FIG. 6, FIG. 6 is a schematic structural diagram of an embodiment of an external unlock apparatus according to an embodiment of the present invention. The external unlock apparatus in this embodiment includes a central processing unit 610 and an interface unit 620 that is connected to the central processing unit 610, where the interface unit 620 may be connected to a mobile terminal.

The interface unit 620 is configured to: after it is detected that a user connects the external unlock apparatus to the mobile terminal, obtain an international mobile equipment identity (IMEI) of the mobile terminal, and a six-place password entered by the user.

The central processing unit 610 is configured to: concatenate the international mobile equipment identity and the six-place password into a twenty-one place verification code; contrast the twenty-one place verification code with a preset verification code stored in the external unlock apparatus, and if the two are consistent, instruct the interface unit to obtain an unlock password of the mobile terminal from the mobile terminal; and contrast the obtained unlock password with an unlock password stored in the external unlock apparatus, and if a contrast result is matched, instruct the interface unit to send the stored unlock password to the mobile terminal, so that the mobile terminal performs unlock according to the unlock password sent by the external unlock apparatus; or if a contrast result is unmatched, replace the stored unlock password with the obtained unlock password, and instruct the interface unit to send the obtained unlock password to the mobile terminal, so that the mobile terminal performs unlock according to the unlock password sent by the external unlock apparatus.

In this embodiment of the present invention, an external unlock apparatus may be used to perform unlock. The mobile terminal unlock method described in this embodiment improves a mobile terminal user experience and mobile terminal security, has a wide application, and better protects privacy security of a mobile terminal user and mobile terminal security.

Figure 7:
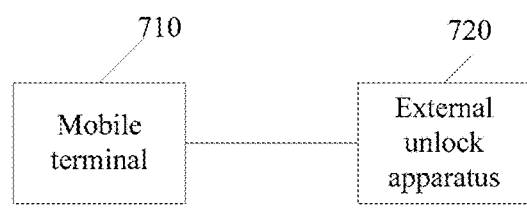
FIG. 7 is a schematic structural diagram of an embodiment of an unlock system according to an embodiment of the present invention.

Referring to FIG. 7, FIG. 7 is a schematic structural diagram of an embodiment of an unlock system according to an embodiment of the present invention. The unlock system in this embodiment includes a mobile terminal 710 and an external unlock apparatus 720.

The mobile terminal 710 is configured to obtain a trigger signal for unlock; generate a first password according to the trigger signal; generate a corresponding unlock signal according to a preset correspondence between the unlock signal and the first password and with reference to the first password, and send the corresponding unlock signal; obtain an unlock password that is obtained by means of parsing by a user according to the unlock signal; match the unlock password with the first password; determine whether the unlock password is consistent with the first password; if a determining result is yes, unlock a password lock; or if a determining result is no, instruct to obtain a trigger signal for unlock again; and if a quantity of times of obtaining a trigger signal for unlock exceeds a maximum quantity of unlock error times, prompt the user to use the external unlock apparatus 720 to obtain a password, where the maximum quantity of unlock error times is a total quantity of times that the mobile terminal user is allowed to enter an incorrect password and that is preset by the mobile terminal user.

The external unlock apparatus 720 is configured to: after the user connects the external unlock apparatus to the mobile terminal as prompted, obtain an international mobile equipment identity (IMEI) of the mobile terminal, and prompt the user to enter a six-place password; concatenate the international mobile equipment identity and the six-place password into a twenty-one place verification code, and contrast the twenty-one place verification code with a preset verification code stored in the external unlock apparatus; if the two are consistent, obtain the password of the mobile terminal from the mobile terminal; contrast the obtained password with a password stored in the external unlock apparatus; and if a contrast result is matched, send the stored password to the mobile terminal, so that the mobile terminal performs unlock according to the password sent by the external unlock apparatus; or if a contrast result is unmatched, replace the stored password with the obtained password, and send the obtained password to the mobile terminal, so that the mobile terminal performs unlock according to the password sent by the external unlock apparatus.

In this embodiment of the present invention, a first password may be generated according to a trigger signal for unlock, an unlock signal is generated according to the first password, an unlock password that is obtained by means of parsing by a user according to the unlock signal is obtained, match is performed to verify whether the unlock password is correct, and if the unlock password is correct, a password lock is unlocked, or if the unlock password is incorrect, unlock is performed again. In addition, according to the unlock method described in this embodiment of the present invention, a location of a mobile phone can be tracked according to obtained positioning data of the mobile phone. The mobile terminal unlock method described in this embodiment improves a mobile terminal user experience and mobile terminal security, has a wide application, and better protects privacy security of a mobile terminal user and mobile terminal security.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a Read Only Memory (ROM), a Random Access Memory (RAM), a magnetic disk, and an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. A mobile terminal unlock method for security protection, comprising:

obtaining a trigger signal for unlock, and entry of an unlock password when the mobile terminal is in a lock out state, generating a first password according to the trigger signal;

generating a corresponding unlock signal according to a preset correspondence between the unlock signal and the first password and with reference to the first password, and sending the corresponding unlock signal, wherein, when generating the first password, the mobile terminal generates a corresponding vibration signal according to a preset correspondence between the vibration signal and the first password and with reference to the first password, the first password containing a character, wherein a mobile terminal user presets a vibration mode in which a particular vibration corresponds to characters that form the first password, wherein according to the mobile vibration signal received by the user, the user determines the first password of the mobile terminal that is the unlock password of the mobile terminal;

obtaining an unlock password that is obtained by means of parsing by the user according to the vibration signal sent by the mobile terminal; after parsing out the unlock password of the mobile terminal according to the vibration signal sent by the mobile terminal, the mobile terminal user determines at least one character to be entered for the unlock password; matching the unlock password with the first password; determining whether the unlock password is consistent with the first password; and when a determining result is yes, unlocking a password lock; or when a determining result is no, obtaining a trigger signal for unlock again.

2. The method according to claim 1, further comprising:
when a quantity of times of obtaining a trigger signal for unlock exceeds a maximum quantity of unlock error times, enabling a global positioning system GPS, obtaining positioning data of a mobile terminal, sending the positioning data to a mailbox bound to the mobile terminal, so that a user can track a location of the mobile phone according to information about the positioning data after obtaining the positioning data, and stopping obtaining a trigger signal for unlock within a specified time, wherein
the maximum quantity of unlock error times is a total quantity of times that the mobile terminal user is allowed to enter an incorrect password and that is preset by the mobile terminal user, and the specified time is a time for which the mobile terminal is automatically locked after an unlock failure and that is preset by the mobile terminal user.

3. The method according to claim 2, the preset correspondence between the unlock signal and the first password comprises a one-to-one correspondence, preset by the user and stored in the mobile terminal, between the unlock signal and the first password, wherein
the first password contains at least one type of character: a digit, a letter, or a symbol.

4. The method according to claim 1, further comprising:
if a quantity of times of obtaining a trigger signal for unlock exceeds a maximum quantity of unlock error times, prompting the user to use an external unlock apparatus to obtain a password, wherein the maximum quantity of unlock error times is a total quantity of times that the mobile terminal user is allowed to enter an incorrect password and that is preset by the mobile terminal user;
after the user connects the external unlock apparatus to the mobile terminal as prompted, obtaining, by the external unlock apparatus, an international mobile equipment identity (IMEI) of the mobile terminal, and prompting the user to enter a six-place password;
after the user enters a six-place password, concatenating, by the external unlock apparatus, the international mobile equipment identity and the six-place password into a twenty-one place verification code; contrasting the twenty-one place verification code with a preset verification code stored in the external unlock apparatus; and if the two are consistent, obtaining, by the external unlock apparatus, the unlock password of the mobile terminal from the mobile terminal; and
contrasting, by the external unlock apparatus, the obtained unlock password with an unlock password stored in the external unlock apparatus; and if a contrast result is matched, sending the stored unlock password to the mobile terminal, so that the mobile terminal performs unlock according to the unlock password sent by the external unlock apparatus; or if a contrast result is unmatched, replacing the stored unlock password with the obtained unlock password, and sending the obtained unlock password to the mobile terminal, so that the mobile terminal performs unlock according to the unlock password sent by the external unlock apparatus.

* * * * *